F. H. HALLEFAS.
ELECTRIC SWITCH.
APPLICATION FILED MAY 28, 1910.

983,275.

Patented Feb. 7, 1911.

Witnesses
J. S. Freeman.

Inventor
F. H. Hallefas,
By C. L. Parker, Attorney

UNITED STATES PATENT OFFICE.

FRANK H. HALLEFAS, OF CHICAGO, ILLINOIS, ASSIGNOR TO THE C. F. PEASE COMPANY, OF CHICAGO, ILLINOIS, A CORPORATION OF ILLINOIS.

ELECTRIC SWITCH.

983,275.  Specification of Letters Patent.  Patented Feb. 7, 1911.

Application filed May 28, 1910. Serial No. 563,923.

*To all whom it may concern:*

Be it known that I, FRANK H. HALLEFAS, a citizen of the United States, residing at Chicago, in the county of Cook and State of Illinois, have invented certain new and useful Improvements in Electric Switches, of which the following is a specification.

My invention relates to electric switches, and particularly to a switch to be used in connection with electric motors.

An important object of this invention is to provide an electric switch, by the employment of which the direction of the current fed to the motor may be readily reversed, to cause the reverse rotation of the armature.

A further object of this invention is to provide a switch of the above character, which when released by the operator will automatically cut off the circuit from the motor.

A further object of this invention is to provide a device of the above character, which is simple in construction proficient in its operation, and cheap to manufacture.

My invention consists generally in the arrangement and combination of parts to be hereinafter described.

Figure 1:
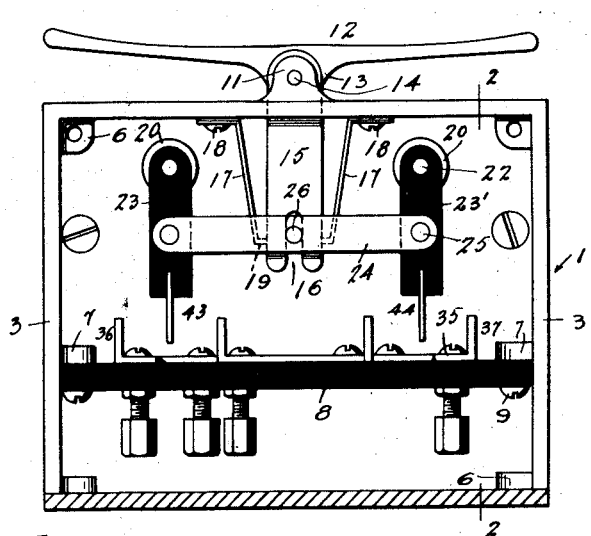
Figure 2:
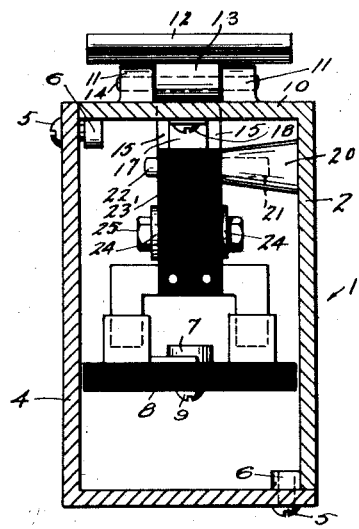
Figure 3:
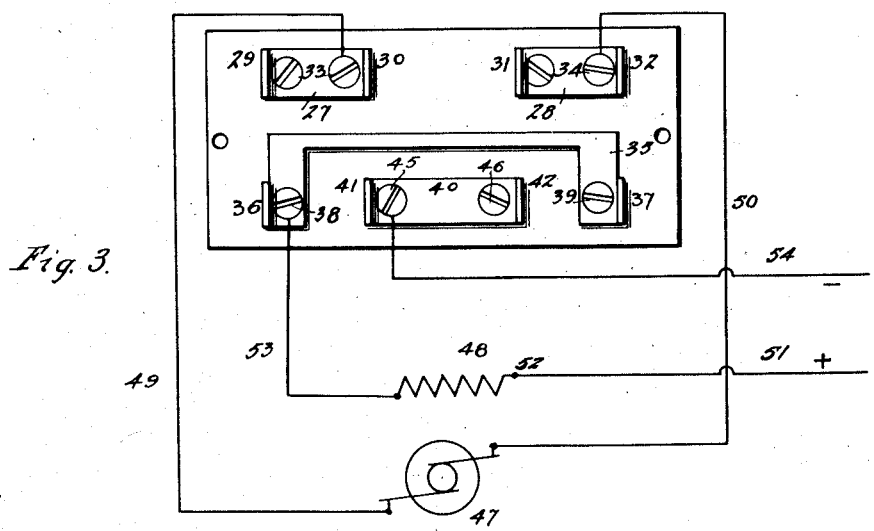

In the accompanying drawings forming a part of this specification, and in which like numerals are employed to designate like parts throughout the same, Figure 1 is a side view of the switch, one side of the casing thereof being removed. Fig. 2 is a transverse vertical sectional view taken on line 2—2 of Fig. 1 and looking in the direction of the arrow. Fig. 3 is a plan view of an insulating support or plate carrying the contacts, and a diagrammatic view of a motor showing suitable connections between said motor and the contacts.

In the drawings, wherein a preferred embodiment of my invention is illustrated, the numeral 1 designates a casing which may preferably be formed of sheet metal or other suitable material such as copper. This casing comprises a body section 2 upon which are formed the end walls 3. The casing 1 further comprises a removable section 4, which is L-shaped in cross section and secured to the body section 2 by means of screws 5 engaging the apertured ears 6 formed upon the free edges of the horizontal and vertical walls of the said body section 2. The end walls 3 are provided near their centers with alined inwardly extending ears 7, to which are secured for support an insulating plate 8, by means of screws 9 or the like. This insulating plate is provided to carry contacts to be described.

The horizontal wall 10 of the body section 2, is provided centrally thereof with transversely alined upstanding ears 11, between which is pivotally mounted a normally horizontally disposed lever 12. This lever is provided centrally thereof with a downwardly extending portion of material 13, provided with a suitable opening for the reception of a pin 14, which passes through suitable openings formed through the ears 11. The portion of material 13 has formed thereon spaced arms 15, which extend through a suitable opening formed in the wall 10. The arms 15 are disposed normally in a vertical position and occupy a substantially central position within the casing 1. The lower end of each of the arms 15 is provided with an axial slot 16, as clearly shown in Fig. 1. From the above description, it is obvious that the arms 15 may be oscillated in either direction by swinging the lever 12 in the direction desired. The arms 15 are normally held in a vertical position by means of springs 17, which are connected to the wall 10 as shown at 18, and have their lower free ends bent inwardly to engage the arms 15, as clearly shown at 19. It is to be understood that the springs 17 are to be constructed of sufficient width to span the opening between the arms 15 to engage the same. It is obvious that when the arms 15 are oscillated in either direction they engage and put under tension one of the springs 17, whereby if the lever 12 is released, the same together with the arms 15 will be returned to their normal position by said spring.

The body section 2 is provided with inwardly extending lugs 20, which are in horizontal alinement and disposed near the wall 10 at equal distances from and upon opposite sides of the arms 15. The lugs 20 are provided with cylindrical axial openings 21 to loosely receive pins 22. These pins have insulating strips 23 and 23' fixedly connected to the same, as shown. These insulating strips may preferably be formed of compressed fiber, while any other suitable insulating material may be employed. As shown in Fig. 1, the insulating strips 23 and 23' are normally vertically disposed and parallel to each other. These strips are connected by horizontal links 24, which have their ends pivotally connected to the insulating strips, as shown at 25. The links 24 are spaced from each other, and between the same is disposed the lower ends of the arms 15, as clearly illustrated in Fig. 1. The links 24 are connected centrally thereof by means of a transverse pin 26, which is disposed within the slots 16.

The insulating plate 8, above referred to is provided upon its upper surface and near one longitudinal edge thereof, with substantially U-shaped contacts 27 and 28. These contacts have upstanding ends 29, 30 and 31, 32 respectively. The contacts 27 and 28 are secured to the insulating plate 8 by means of screws 33 and 34 respectively. One of the screws 33 and 34 is employed as a binding post for its respective contact. The insulating plate 8 is further provided with a horizontally disposed U-shaped metal section 35, which is arranged approximately centrally upon the insulating plate and provided at its ends with upstanding contacts 36 and 37. The contact 36 is in transverse alinement with the upstanding portion 29 of contact 27 and the contact 37 is in transverse alinement with the upstanding portion 32. The metal section 35 is secured to the insulating plate 8 by means of screws 38 and 39, the former also serving as a binding post.

Arranged upon the insulating plate 8 and within the U-shaped section of metal 35, is a U-shaped contact member 40, having upstanding contact ends 41 and 42, which are respectively in transverse alinement with the upstanding portions 30 and 31. The insulating strips 23 and 23′ above referred to, have their lower ends provided with transverse slots to receive inverted U-shaped contacts 43 and 44 respectively, which are fixedly secured thereto by any suitable means. The contacts 43 and 44 coöperate with the contacts arranged upon the insulating plate 8, in a manner to be described. The contact member 40 is secured to the contact plate 8 by means of screws 45 and 46, and the former serves as a binding post.

The numerals 47 and 48 designate respectively, diagrammatic illustrations of the armature and field of a series wound direct current electric motor. The armature 47 is electrically connected by means of the lines 49 and 50 with the contacts 27 and 28. A feed wire 51 is connected to the field 48 as shown at 52, and the field 48 is connected by means of line 53 and binding post 38 with the contact member 35. A return wire 54 has electrical connection with the contact member 40, by means of the binding post 45.

The operation of my switch is as follows:—When the contacts 43 and 44 are in the positions shown in Fig. 1, the circuit is open and the current accordingly not supplied to the motor. If the right hand end of the lever 12 is depressed, the arms 15 will be oscillated to the left, and the U-shaped contact 43 brought into engagement with the upstanding contacts 29 and 36. At the same time the contact 44 will engage the upstanding contacts 31 and 42. A circuit is thus closed which is complete as follows: Current is supplied through the feed wire 51 and passes through the field winding 48 and through the line 53 to the contact 36. Current then flows through the contact 43 and through the contact 29 into the line 49 and then through the armature 47. The current then flows through the line 50, contact 31, and through the contacts 44 and 42 into the return wire 54 and then back to the source of current. As soon as the operator removes the pressure from the lever 12, the same is returned by the spring 17 to its normal horizontal position and the above described circuit opened. When the left hand end of the lever 12 is pressed, the contact 43 engages the upstanding contacts 30 and 44. The contact 44 also engages contacts 32 and 37. A new circuit is accordingly closed which is as completed as follows: The current from the source of power flows through the wire 51, through the field winding 48 and through the line 53 to the U-shaped metal section 35 and through the same to the contact 37. From contact 37 through contact 44 to contact 32 and then through the line 52 to the armature. The current is now supplied to the armature in an opposite direction from which it was supplied during the operation of the first circuit above described. The current leaves the armature 47 and passes by means of the line 49 to the binding posts 33 and then to the contact 30. From the contact 30 the current passes through the contact 43 to contact 41 and then to the binding post 45 and into the return wire 54 and accordingly back to the source of current. It is thus seen that by the employment of this switch, the direction of the current in the armature may be readily reversed, while the direction of the current in the field winding remains the same.

It is to be understood that the form of my invention herewith shown and described is to be taken as a preferred example of the same, and that certain changes may be made in the shape, and size and arrangement of parts without departing from the spirit of my invention.

Having fully described my invention, I claim:—

1. In an electric switch, a stationary contact having upstanding spaced ends, a pair of stationary contacts to coöperate with the first named contact, and having upstanding ends, a movable contact to alternately engage either of the upstanding ends of the first named contact and connect the same with the upstanding end of one of the second named stationary contacts.

2. In an electric switch, stationary contacts, movable contacts arranged above the same to coöperate therewith, and to swing in a substantially vertical plane, a normally horizontally disposed operating lever, connecting means between the same and the movable contacts, and springs to return said lever to its normal position when released.

3. In an electric switch, a stationary contact having spaced upstanding portions, a pair of stationary contacts to coöperate therewith and having upstanding portions, a movable contact to alternately engage either upstanding portion of the first named contact and connect such upstanding portion with the upstanding portion of one of the second named stationary contacts, and means to effect the movement of said movable contact.

4. In an electric switch, a pair of stationary contacts, each of said stationary contacts having spaced upstanding portions, a second pair of stationary contacts, each contact of said second pair having spaced upstanding portions, movable contacts to coöperate with the first and second named pairs of stationary contacts, each of said movable contacts being adapted to alternately engage either upstanding portion of one contact in the first named pair, to connect such upstanding portion with the upstanding portion of one of the stationary contacts in the second named pair, said movable contact when engaging the other upstanding portion of the same stationary contact of the first named pair, serving to connect such other upstanding portion with the upstanding portion of the other stationary contact in the second named pair, and means to effect the movement of said movable contacts.

5. In an electric switch, a pair of stationary contacts, having upstanding spaced ends, a third stationary contact having upstanding ends in transverse alinement with the outer upstanding ends of the first named contacts, a fourth stationary contact having upstanding ends in transverse alinement with the inner ends of the first named stationary contacts, swingingly mounted contacts to coöperate with said stationary contacts, means to pivotally connect said swingingly mounted contacts, and means to effect the movement of the first named means.

In testimony whereof I affix my signature in presence of two witnesses.

FRANK H. HALLEFAS.

Witnesses:
C. F. PEASE.
J. T. HANNA.